United States Patent
Ritzau

(10) Patent No.: US 7,512,767 B2
(45) Date of Patent: Mar. 31, 2009

(54) DATA COMPRESSION METHOD FOR SUPPORTING VIRTUAL MEMORY MANAGEMENT IN A DEMAND PAGING SYSTEM

(75) Inventor: Tobias Ritzau, Veberöd (SE)

(73) Assignee: Sony Ericsson Mobile Communications AB, Lund (SE)

( * ) Notice: Subject to any disclaimer, the term of this patent is extended or adjusted under 35 U.S.C. 154(b) by 379 days.

(21) Appl. No.: 11/355,221

(22) Filed: Feb. 15, 2006

(65) Prior Publication Data

US 2007/0157001 A1 Jul. 5, 2007

Related U.S. Application Data

(60) Provisional application No. 60/756,143, filed on Jan. 4, 2006.

(51) Int. Cl.
*G06F 12/00* (2006.01)
(52) U.S. Cl. .............................. 711/170; 711/6; 375/240
(58) Field of Classification Search ................. 711/170, 711/6; 375/240
See application file for complete search history.

(56) References Cited

U.S. PATENT DOCUMENTS

| 6,266,753 | B1* | 7/2001 | Hicok et al. | 711/202 |
| 6,510,499 | B1* | 1/2003 | Aaker | 711/154 |
| 2005/0132161 | A1* | 6/2005 | Makela et al. | 711/170 |
| 2005/0169465 | A1* | 8/2005 | Itani | 380/42 |
| 2006/0047916 | A1* | 3/2006 | Ying et al. | 711/144 |

\* cited by examiner

*Primary Examiner*—Kevin L Ellis
*Assistant Examiner*—Hashem Farrokh
(74) *Attorney, Agent, or Firm*—Renner, Otto, Boisselle & Sklar, LLP

(57) ABSTRACT

A virtual memory management unit (306) includes a redundancy insertion module (307) which is used for inserting redundancy into an encoded data stream to be compressed, such that after being compressed each logical data block fits into a different one from a set of equal-sized physical data blocks of a given size. For example, said redundancy may be given by no-operation (NOP) instructions represented by a number of dummy sequences of a given length (L) into an encoded data stream to be compressed, each dummy sequence being composed of a number of identical binary or hexadecimal fill-in values.

16 Claims, 8 Drawing Sheets

DATA COMPRESSION METHOD FOR SUPPORTING VIRTUAL MEMORY MANAGEMENT IN A DEMAND PAGING SYSTEM

RELATED APPLICATION DATA

The present application claims the benefit of U.S. Provisional Application Ser. No. 60/756,143, filed Jan. 4, 2006, the disclosure of which is herein incorporated by reference in its entirety.

TECHNICAL FIELD OF THE INVENTION

The present invention generally relates to the field of data compression in a demand paging system which is organized according to a virtual memory management technique. It particularly refers to a memory management system on a computing device and a corresponding method which support virtual memory management and demand paging for translating a virtual address space accessed by a data processing unit of said computing device into a physical address space.

BACKGROUND OF THE INVENTION

Due to the ever increasing size of application programs, modern operating systems use the concept of virtual memory management in order to considerably extend the visible size of a computing device's random access memory (RAM), in the following also referred to as "main memory" or "primary memory", by backing the RAM with a storage area of a further memory referred to as "auxiliary memory" or "secondary memory" on a permanent (non-volatile) storage device called "swap device", such as, e.g., a hard-disk drive or a USB memory stick. This swapping process thereby allows multitasking systems to run a multiplicity of time-sliced processes on the computing device. For example, an active process running on said computing device can be given access to the entire virtual address space accessible by a data processing unit of said computing device. Idle processes can be swapped out to said secondary memory and kept ready to run when their turn arrives again. The virtual address space that can be accessed by this data processing unit is typically divided into page frames, and a translation mechanism is applied to convert virtual address references issued by a running process to a physical page which contains instructions or contents data required by the process. When an operating system runs low on physical pages, pages which have not been used in the recent past can be written to the above-mentioned swap device. Newly available page frames can then be supplied to active processes. When a page frame cached on the swap device is required at a later time by a process, a page fault occurs and the data has to be fetched back from the swap device. The problem is that the throughput for applications whose working set size does not fit in said primary memory degrades significantly owing to an increase in the number of page faults. Disk access latencies are usually of the order of tens of milliseconds, which is much longer than memory access time, the latter being typically of the order of several tens or hundreds of nanoseconds. Hence, recent research has proposed compressing memory pages in preference to swapping them out to disk. This hides long latencies associated with a disk access because a page has to be merely decompressed when a page fault occurs. Such a compressed memory system, in the following also referred to by the generic term "memory management system", can be implemented in various ways, including software approaches, such as, e.g., modifications of the operating system kernel, and hardware implementations, such as, e.g., compressed cache lines. The former approach requires access to the kernel source code and thus may not be easily ported across different operating systems. A hardware implementation, on the other hand, may add to the cost of the computing device.

As described above, virtual memory management techniques can be applied to expand an application's view to the main memory of a computing device, but it can also be used to virtually execute an application program's machine code directly from a memory module integrated in or connected to said computing device, e.g., a hard-disk drive or a USB memory stick, which otherwise does not permit direct execution of program data physically stored in the memory module. Conventionally, a secondary memory divided into multiple logical data blocks, each logical data block consisting of a single physical data block or more than one equal-sized physical data blocks representing the smallest readable units of data, is employed, and data requested from said secondary memory are copied to said primary memory when required. When a logical data block in a storage area of the second memory is accessed by a specific process of an application running on the computing device, this logical data block is copied into a designated storage area of said primary memory. In order to save storage capacity of said secondary memory, data to be stored in the secondary memory (e.g., the machine code of a software program to be executed by an application accessing said primary memory and said secondary memory) can be compressed, which can be made transparent to all applications accessing said secondary memory by decompressing these data when copying them to the primary memory. However, the size of the compressed data is unknown, which may cause problems when copying said data. The compressed data can be found by using a pointer (also referred to as "index") which indicates where compressed logical data blocks start and end, respectively, but the employed compression procedure often (typically, in more than 50% of all cases) causes the compressed logical data blocks to cross physical block boundaries, which makes it necessary to access more of the compressed logical data blocks than necessary to be able to decompress and copy a single logical data block. As known from the prior art, an approach to cope with the above-identified problem is to cache some of these compressed logical data blocks from the secondary memory into the primary memory, but the effectiveness of this approach is unknown.

In most cases, encoded data (e.g., a software machine source code) can be compressed to an amount between 50% and 60% of its original size. If all data blocks to be stored in the secondary memory could be compressed to half their original size, it would be possible to store logical data blocks in form of physical data blocks having half the size of the logical ones (or any integer multiple of that size). This would make an index search redundant and the loading of the encoded data fast. However, this is hardly ever the case.

SUMMARY OF THE INVENTION

In view of the above, the present invention provides a more efficient compression procedure for compressing logical data blocks to be stored in the secondary memory so as to avoid time-consuming index searches in the logical address space of said data.

According to one aspect of the present invention, the invention provides a virtual memory management unit of a demand paging system installed on a computing device, wherein the demand paging system is controlled by an operating system organized according to a virtual memory management technique which is used for translating a virtual address space accessible by a data processing unit of said computing device into a physical address space by swapping data (e.g., data which have not been used within a specific period of time in the recent past) from an addressable storage area of a memory module integrated within the computing device to a storage means used for permanently storing these data. Said storage means can be realized as an integrated memory module of the computing device (e.g., as an internal random access memory) or as an external swap device which is not comprised within the computing device (such as, e.g., a hard-disk drive or USB memory stick). According to one embodiment, said virtual memory management unit comprises a redundancy insertion module for inserting redundancy into an encoded data stream to be compressed, such that after compression each logical data block fits into a different one from a set of equal-sized physical data blocks of a given size. The redundancy may be formed by any kind of suitable fill-in data, fill-in operations, repetitive patterns and so forth, which is easy to compress. For example, the redundancy may be given by no-operation (NOP) instructions. These NOP instructions could be represented by a number of dummy sequences of a given length L, whereby each dummy sequence comprises a number of identical or repetitive fill-in values.

The data stream may comprise any kind of data, such as content data, media data, program data, machine code, any kind of software programs or software functions, applications and so forth.

For example, each of the mentioned dummy sequences may be composed of a number of zero values. The number of these dummy sequences can advantageously be chosen such that each logical data block from the encoded data stream to be stored in said storage means is compressed to a fraction of its original size, which results in the fact that after compression each logical data block fits into a different one from a set of equal-sized physical data blocks, each physical data block having a size of said fraction of the logical data block's original size. For example, each logical data block from the encoded data stream to be stored in the storage means mentioned above may be compressed to half its original size.

According to another aspect of the invention, the invention provides a data compression method for supporting virtual memory management and demand paging on a computing device, wherein said computing device runs an operating system organized according to a virtual memory management technique for translating a virtual address space accessible by a data processing unit of said computing device into a physical address space by swapping data from an addressable storage area of a memory module integrated within the computing device to a storage means used for permanently storing these data. This data compression method is thereby characterized by the step of inserting redundancy into an encoded data stream to be compressed (e.g., a part of an application program's machine code). The encoded data stream that has been extended by said redundancy is then submitted to a data compression procedure, which in the case of program data may be executed during the time needed for compiling the machine code, such that after said data compression procedure each logical data block fits into a different one from a set of equal-sized physical data blocks of a given size, and the obtained compressed version of the extended data stream is finally stored in the storage means.

According to this data compression method, an encoded data stream to be compressed can be filled up with any kind of fill-in data, fill-in functions, repetitive patterns and so forth, for example by NOP instructions represented by dummy sequences (e.g., "0 x00000000") of a specific length L (e.g., 32 bit), in the following referred to as "padding", wherein each dummy sequence is composed of a given number of identical fill-in values. This has the effect that the performance of a data compression procedure for compressing the encoded data stream is enhanced. For example, each dummy sequence may be composed of a specific number of zero values ("zero filling"). With enough padding each logical data block from the encoded data stream to be stored in the storage means is compressed to a fraction of its original size such that after compression each logical data block fits into a different one from a set of equal-sized physical data blocks, each physical data block having a size of said fraction of the logical data block's original size. For example, each logical data block from the encoded data stream to be stored in the storage means mentioned above may be compressed to half its original size. The proposed method according to the present invention thereby comprises the steps of compressing each logical data block of encoded data to be stored, adding redundancy as defined above to the encoded data stream in case the applied compression procedure yields too large compressed data blocks and then recompressing the original (uncompressed) encoded data stream until each compressed data block fits into a physical data block of a given size.

However, there may still be cases in which issues arise, such as when data stored in said secondary memory is hard to compress, which typically applies to already compressed data such as, e.g., compressed audio data and encrypted contents data. Therefore, these types of data may not be handled in the manner described herein and should be stored in a special part of the secondary memory (typically, in the file system). Another issue is how to fill in said dummy sequences into the encoded data to be compressed without causing changes in the behavior of an application running on the computing device, said application having access to the primary and to the secondary memory. In case that the encoded data stream comprises or consists of software code with software functions, the redundancy can be inserted either in between adjacent functions or within or inside respective functions. The term "functions" is intended to comprise any kind of software code partition, e.g., subroutines, function calls and so forth. Any kind of redundancy can be used for the insertion between adjacent functions. For the insertion within or inside a function, redundancy has to be chosen so that it does not change the behavior of the software when executing the functions, e.g., no operation instructions or unconditional jump instructions.

Changes concerning an insertion of NOP instructions into the original encoded data can be done in the object code of these data. Performing these changes on the original encoded data may cause a measurable delay which is not negligible, but in virtually all cases this does not make any difference. If the encoded data can not be adapted in this way, it is possible to fill in data from a resident storage area of the secondary memory that does not apply any virtual memory management techniques or data from a storage area that uses another virtual memory management technique.

The invention is also dedicated to a computer program product directly loadable into an internal memory of a computing device, wherein said computer program product comprises machine code for executing a data compression method as described above when running on the computing device.

Notwithstanding the above-described subject matter, it should be noted that said virtual memory management unit as well as the data compression method according to the invention are not limited to being applied to a computing device as described above but that they can advantageously be applied to any electronic device (e.g., a portable radio communication equipment such as a mobile phone, a pager, an electronic organizer, a smartphone or the like) running an operation system that is organized according to a virtual memory management technique for translating a virtual address space accessible by an integrated data processing unit of this electronic device into a physical address space by swapping data from at least one addressable storage area of at least one memory module integrated within said electronic device to a storage means (e.g., a RAM) used for permanently storing these data.

It should be emphasized that the term "comprises/comprising" when used in this specification is applied to specify the presence of stated features, integers, steps or components but does not preclude the presence or an addition of one or more further features, integers, steps, components or groups thereof.

BRIEF DESCRIPTION OF THE DRAWINGS

Features, aspects, and advantages of the invention will become evident from the following description, the appended claims, and the accompanying drawings.

FIG. 6b shows a more detailed flow chart illustrating step S603 of the data compression method illustrated by the flow chart depicted in FIG. 6a.

DETAILED DESCRIPTION

In the following, the invention will be explained in more detail with respect to special embodiments and in relation to the accompanying drawings.

Figure 1A:
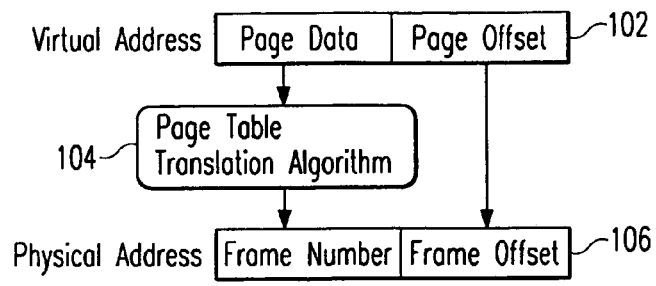
FIG. 1a shows a diagram which illustrates the process of translating a virtual address into a physical address.

A diagram which illustrates the process of translating a virtual address 102 used by an application program running on a computing device, said virtual address consisting of page data and a page offset, into a physical address 106 of a physical address space on a external swap device accessible by said computing device, said physical address consisting of a frame number followed by a frame offset, is shown in FIG. 1a. The applied translation algorithm 104 is typically based on the use of a "page table" supplied by a memory management system of said computing device. Even though said translation algorithm 104 may vary slightly between processors and may sometimes be implemented in software, modern processors all use roughly the same method for translating virtual page numbers to physical frame numbers by means of page tables, which are implemented by arrays that associate a selected number of virtual page numbers with physical frame numbers. Because the virtual address spaces of most processes are both large and sparse, page table entries are only allocated for those portions of such a virtual address space which are actually used. To determine the physical address corresponding to a given virtual address, an appropriate page table and the correct entry within that page table must be located.

Figure 1B:
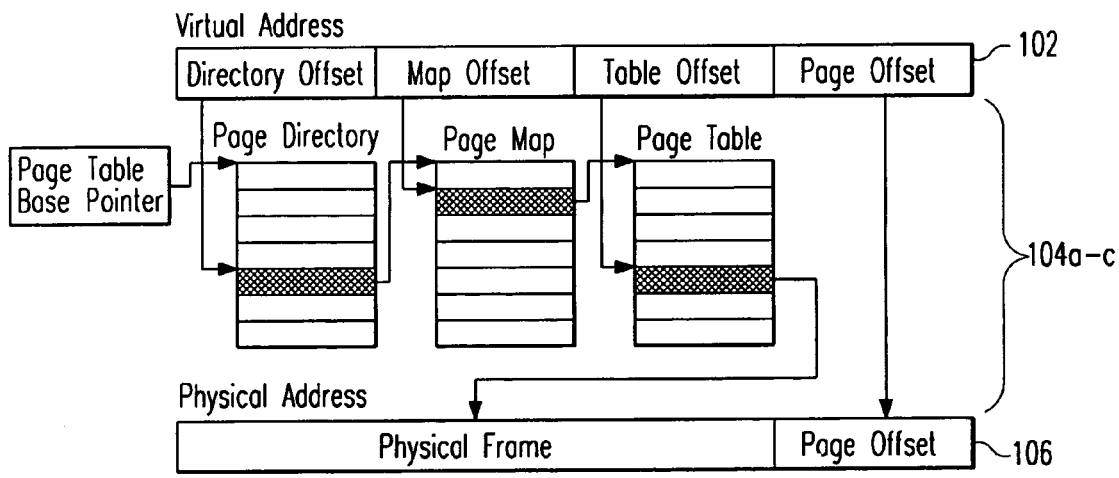
FIG. 1b shows the translation of a virtual address to a physical address by means of a page directory, a page map and a page table.

For systems which use three-level page tables a virtual address 102 is subdivided into four fields: a directory offset field which specifies an entry in a preprocess page directory 104a, wherein said entry contains the address of a page map table 104b, a map offset field which specifies an offset within the specified page map table 104b, said map offset giving the address of a page table 104c, a table offset field which contains an index for specifying a chosen page table 104c by returning the number of a physical page frame, and, finally, a page offset field for specifying a page offset within a physical frame which contains data referred to by the virtual address. This address resolution procedure is depicted in FIG. 1b. In this connection, it should be noted that if memory segments are applied, segment translation typically occurs before any operations involving said page table are executed.

Figure 1C:
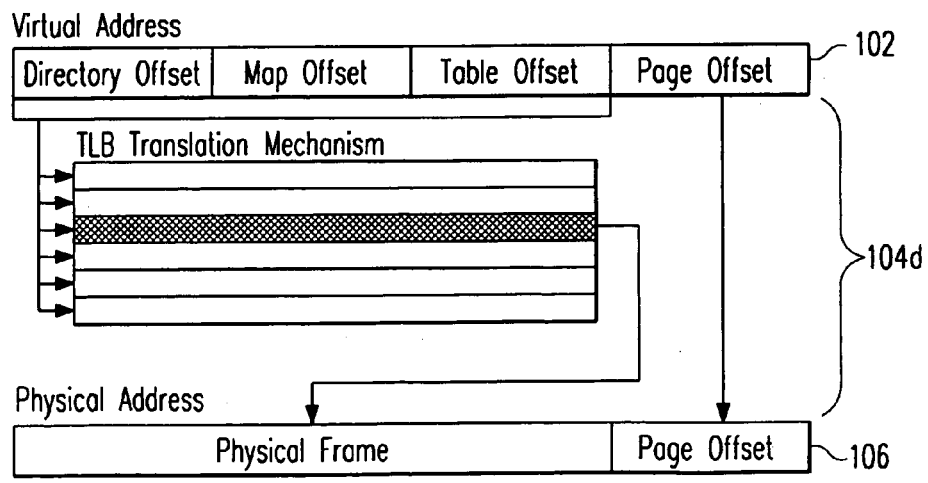
FIG. 1c shows the translation of a virtual address to a physical address by using a translation look-aside buffer (TLB)

Due to the fact that multiple memory locations must be accessed to resolve each virtual memory address, virtual address translation using page tables is a relatively expensive operation. To speed up these mappings, a specialized high-speed associative memory store referred to as "translation look-aside buffer" (TLB) is used. A TLB caches recently used mappings of virtual page numbers to physical page frames. On every virtual memory access, all entries in a TLB are checked to see whether any of them contain the correct virtual page number. In case an entry has been found for a virtual page number, a TLB hit has occurred, and the corresponding physical page frame is immediately accessed. Otherwise, which means in case of a TLB miss, appropriate page tables are consulted in the previously discussed manner. The found mapping is then added to the TLB by replacing a mapping. FIG. 1c shows the translation of a virtual address to a physical address by using a TLB 104d and illustrates what happens on a TLB hit.

Because of the principle of locality, TLB translation works very well in practice. System designers have noticed, however, that code and data exhibit different patterns of locality. To prevent interference between these patterns, cache memories for caching code and data are often separated; for similar reasons, most modern processors access separate code and data TLBs. Thereby, CPU caches mark referenced memory as code or data depending upon whether it is sent to an instruction decoder. Whenever an instruction is fetched from a memory, an instruction pointer is translated via the code TLB into a physical address. When data are fetched or stored, a central processing unit (CPU) uses a separate data TLB for the translation process. Using different TLB units for code and data allows the processor to maintain a more accurate representation of recently used memory. Moreover, using separate TLBs protects against frequent random accesses of code (data) overloading a TLB. Since most code and data references exhibit high degrees of locality, a combination of a small but fast storage means (such as, e.g., an on-chip cache memory) and a larger but much slower storage means (such as, e.g., a DRAM memory) can approximate the performance of a large and fast storage means.

As the memory management unit presents a virtual address space to a running application, the application needs not be aware of the physical sections of memory which it actively uses. Therefore, even though the virtual address space of a program is contiguous, the physical regions of memory it uses may not be. This presents a great opportunity for the operating system. Not only does it allow multiple applications to be run on the system (each with its own unique virtual address space mapping to different physical pages), but it also allows the computing device's operating system to only keep in physical memory those parts of each application which are actually required at the current time. Since not all pages of virtual memory may map to a physical page, there must be a way for the central processing unit (CPU) of said computing device to inform the operating system when a virtual address does not have a physical mapping. The CPU does this through the use of a page fault interrupt. For this purpose, the CPU stores the virtual address which has caused a page fault in an internal register, and then signals the operating system by means of an interrupt handler. The operating system then updates the mapping of virtual to physical addresses such that a requested virtual address can be mapped to a specific physical address. This means swapping a section of the application's program into a physical memory on a disk or any other storage means. After that, the operating system signals the CPU to retry the interrupted instruction by returning from the interrupt. The operating system also has the choice of aborting an execution of the application if it determines that a virtual address is invalid, e.g., if the virtual address refers to a memory that has not been allocated.

Figure 2:
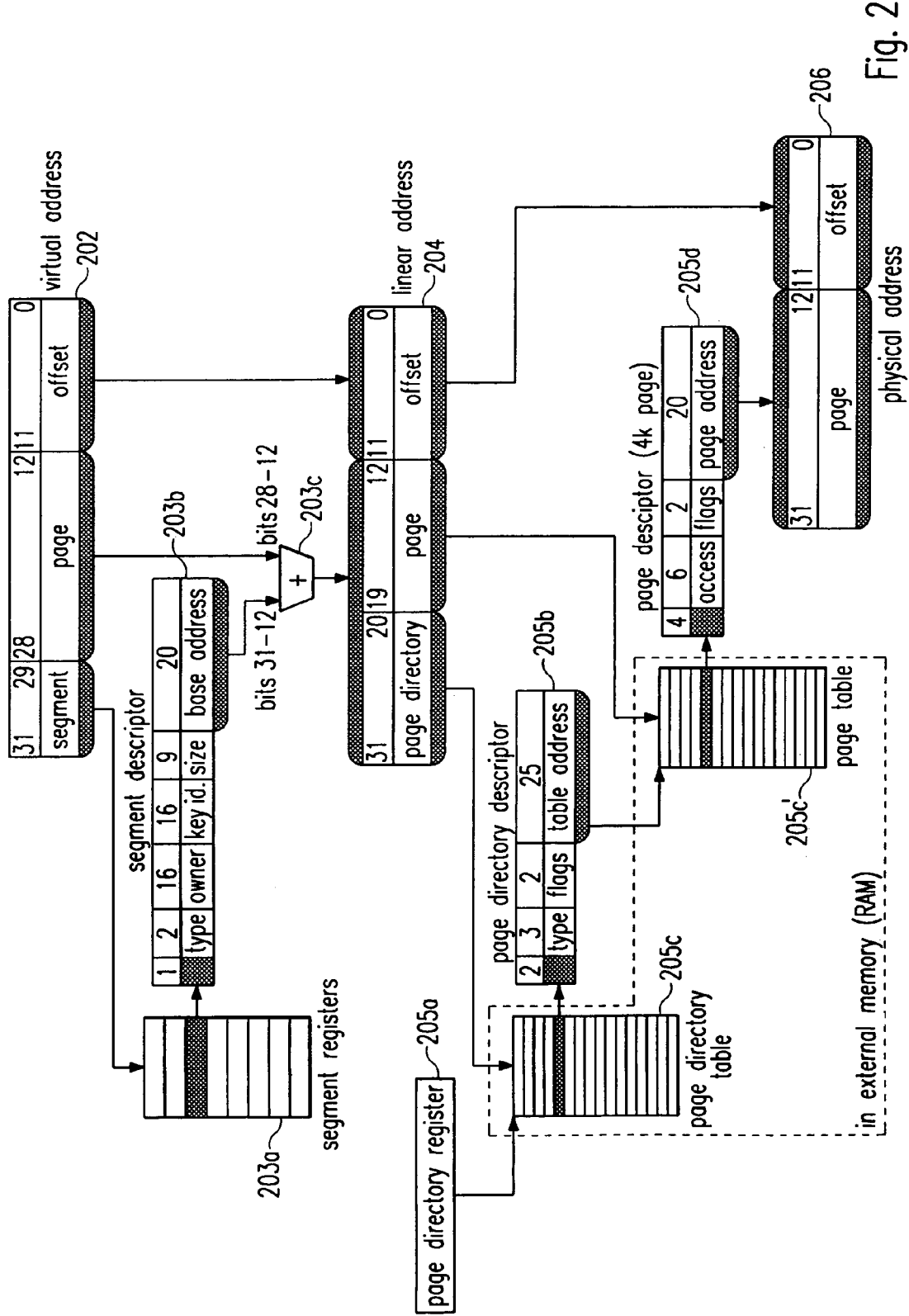
FIG. 2 shows a more detailed memory management architecture for executing the process of virtual address translation as depicted in FIGS. 1a-c.

A more detailed memory management architecture for executing the above-described process of virtual address translation as depicted in FIGS. 1a-c is shown in FIG. 2. This memory management architecture uses a 32-bit virtual address 202 which is subdivided into three fields: a) a segment register number consisting of the three most significant bits 31 to 29, b) a page number consisting of bits 28 to 12, and c) a page offset consisting of bits 11 to 0. Conventionally, a segmentation procedure is used which helps to reduce the information redundancy in the page descriptors 205d. A segment number is given indirectly by a segment register number which is used for specifying a register from a set of eight segment registers 203a. These eight segment registers are loaded by the operating system during the initialization procedure and at each task switching. If a task needs more than eight segment references, it can load a new segment's number into the segment registers 203a or use a specific prefix instruction. According to the address resolution mechanism depicted in FIG. 2, a base address from a segment descriptor 203b is added to the virtual page address 202 to yield a linear address 204. After that, the linear page address 204 is translated into a physical page address 206 by a two-level page table scheme that comprises a page directory table 205c and a page table 205c', wherein said page table 205c' may contain page descriptors 205d for different page sizes (4 Kbyte, 64 Kbyte or 1 Mbyte) so as to match the different kinds of memory needed by the respective applications. For 64-Kbyte and 1-Mbyte pages, the remaining bits of the linear page address are used as an address offset, such that the total offset field may range from 12 to 20 bits, depending on the page size. To maintain an acceptable performance in spite of the two memory accesses needed to translate the virtual address, a conventional fully-associative 64-entry TLB (not shown) is applied.

Figure 3:
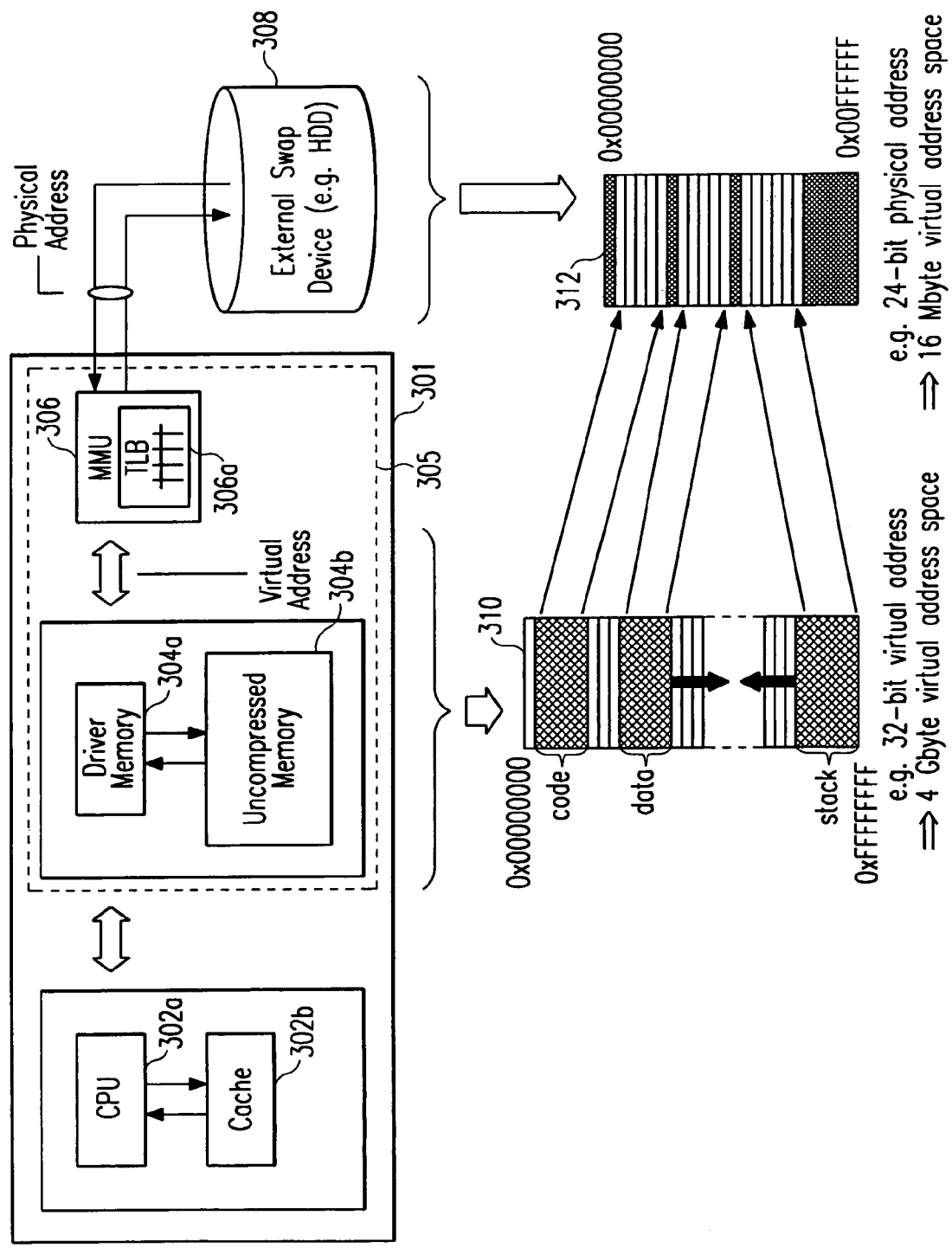
FIG. 3 shows a memory management system.

FIG. 3 shows a block diagram which illustrates the setup of a typical memory management system according to the prior art that comprises a memory management unit (MMU) implemented in the form of a loadable device driver module 306 with an integrated TLB 306a. This memory management system provides support for compressed in-memory caching of data. Its main benefit comes to light when it is used on swap devices, but it can also be used on conventional file system devices such as the computing device 301 depicted in FIG. 3. The system architecture of the above-described memory management system consists of a demand paging system 305, the demand paging system comprising said MMU 306, a driver memory 304a for caching compressed pages and an uncompressed memory 304b, as well as an external swap device 308. The device driver 306 thereby appears as a regular block device to the system once it is loaded. It is formatted as a swap partition and added as a swapping device to the memory management system. When the operating system of said computing device 301 tries to swap out a page, it sends a write request to the swap device 308. The MMU 306 intercepts this write request, compresses said page and then copies the compressed page to a previously reserved storage area in an internal memory of said swap device 308. When a process tries to access this page at some later time by sending a read request to said swap device 308, the device driver 306 intercepts this read request and then decompresses the requested page. Because decompression of a page is much faster than reading data from a disk, total execution time for an application is significantly reduced. As can be taken from FIG. 3, a virtual (pre-MMU) cache memory 302b which can be accessed by the CPU 302a of said computing device 301 works in parallel with the MMU 306 and, provided that said page descriptor 205d is stored in the TLB 306a and the corresponding entry is stored in said virtual cache memory 302b, the virtual cache memory 302b and the MMU 306 each output a specific physical address at the same time, such that cache tags can be compared with the physical address of the page descriptor 205d as depicted in FIG. 2.

Figure 4A:
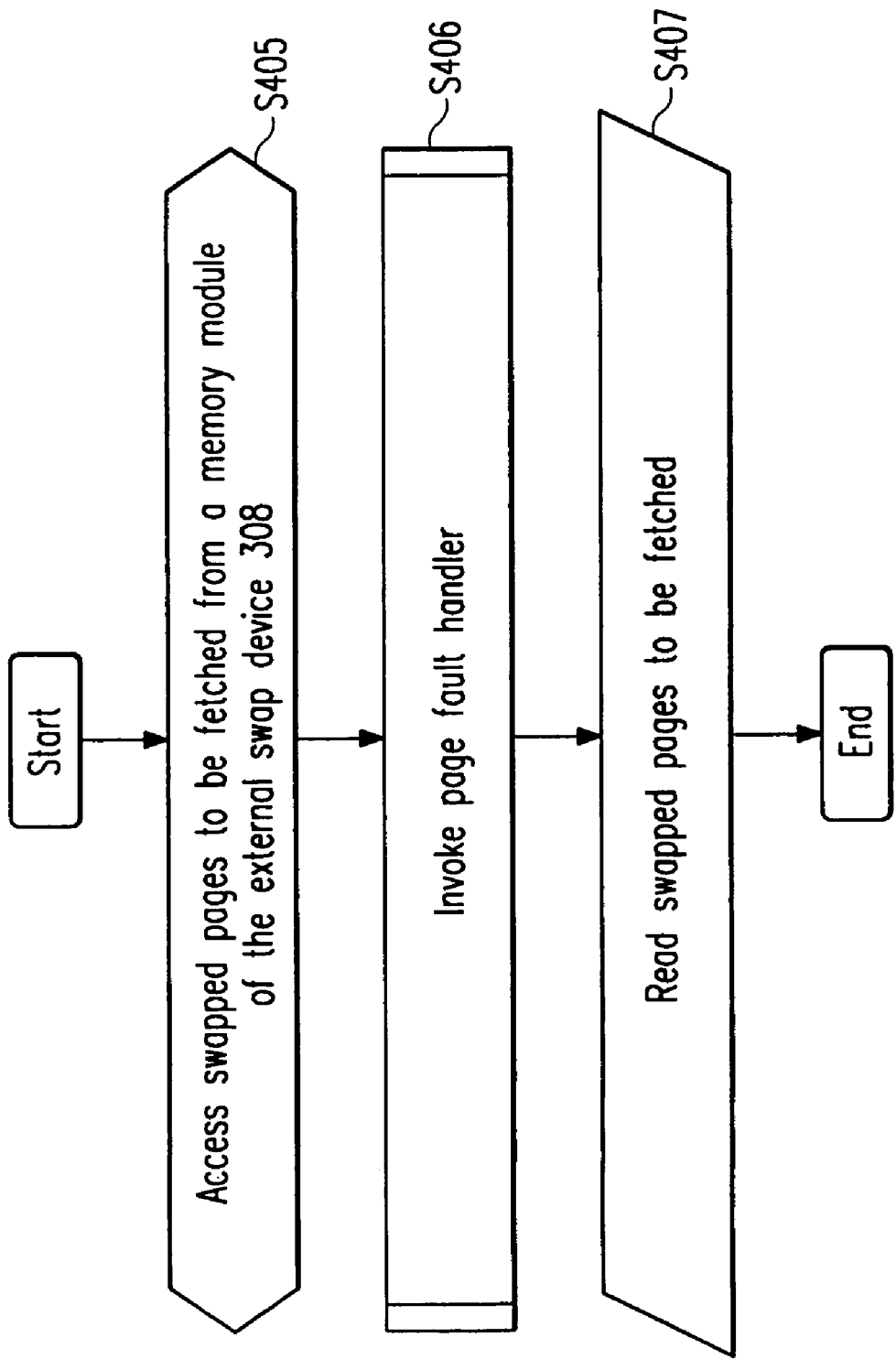
FIG. 4a is a flow chart for illustrating a typical page-in operation in case of a page fault on an access to a page frame stored on an external swap device.

In order to better understand the operation of a typical memory management system, it is helpful to briefly review the standard paging operation of such a system. When a page which was written to disk is accessed (S405), it has to be explicitly fetched back from said swap device and put into a free physical page frame. This results in a page fault (S406) and causes a page-in operation (S407) as illustrated by the flow chart depicted in FIG. 4a. As mentioned above, disk access is multiple orders of magnitude slower than direct memory access. The operating system can try to hide the latency of such a disk access by switching to another runnable process or by aggressively prefetching pages from disk. In many computing environments, however, there is no other process which can be run to hide disk access latencies. On the other hand, prefetching of pages from disk works perfectly only if the page reference pattern of an application can exactly be predicted. This is not possible or prohibitively expensive in terms of computational resources for the general case. Swap daemons (e.g., agents) therefore often try to capitalize on the locality of reference information that most application programs exhibit by clustering page-ins. Nevertheless, there is still considerable room for a performance improvement via memory compression. The idea behind memory compression is to hide said disk access latencies by storing swapped out page frames in a compressed form, but still in a physical memory. On a subsequent page fault, a compressed page can quickly be decompressed and then supplied to an application program. The above-mentioned physical memory is logically divided into two parts, an uncompressed memory and a compressed memory, wherein the uncompressed memory caches frequently used pages from said compressed memory. This compressed memory, in turn, caches pages from the swap device and is managed by a kernel device driver.

Figure 4B:
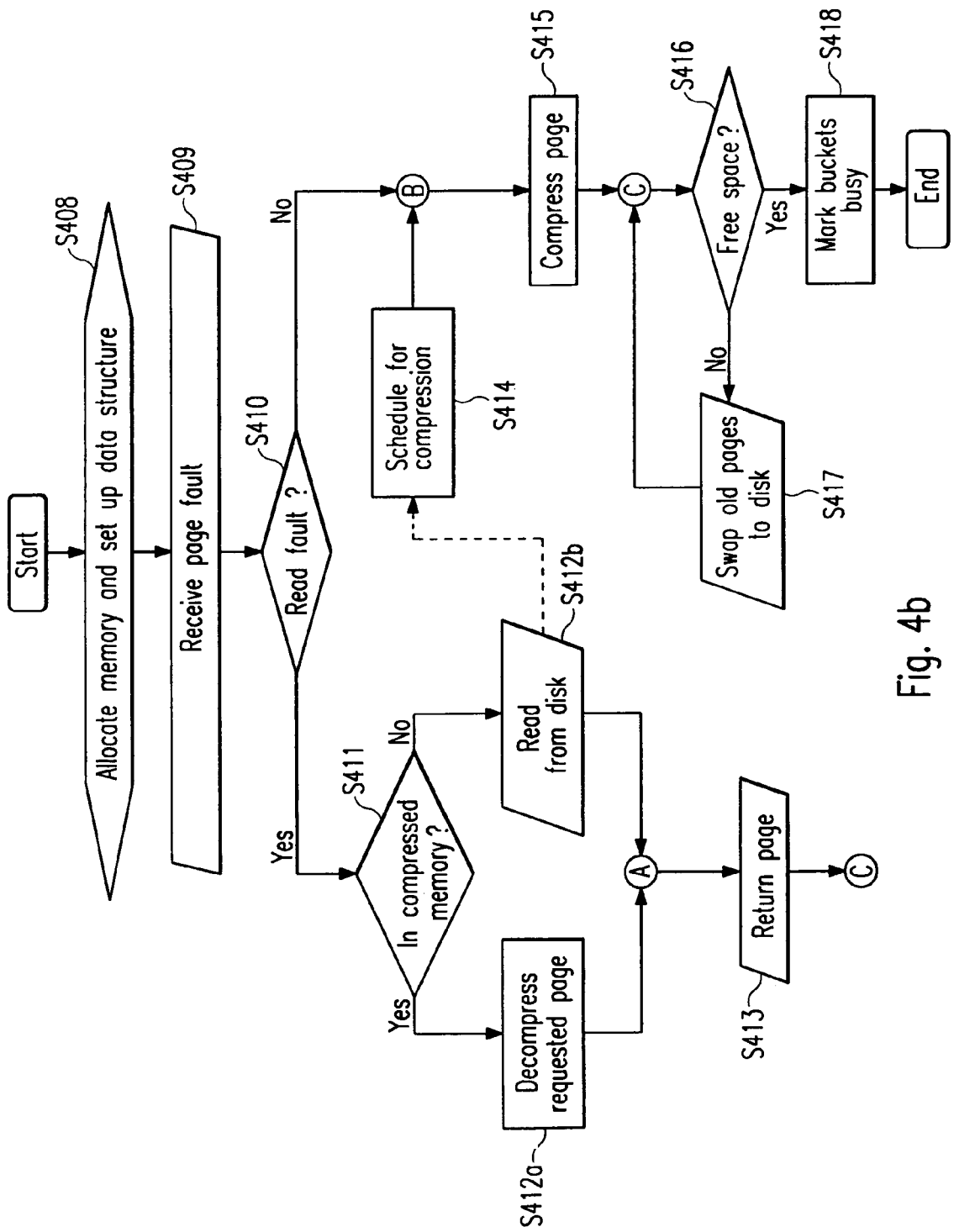
FIG. 4b is a flow chart for illustrating a typical memory compression algorithm.

A frequently applied memory compression algorithm is shown in FIG. 4b. After having allocated some kernel memory based on load time parameters (S408), said memory is carved into fixed size buckets of, e.g., 256 byte. These buckets are then chained together into a linked list. The size of a swap file, that is also specified at load time, is used to create a page table with one entry per swap page. This page table entry includes a pointer to the start of a bucket chain in which a compressed page is held and the size of this compressed page. The amount of memory required by the compressed page depends on the contents of this page as well as on the applied memory compression algorithm. In some cases the compressed data can actually be larger owing to some constant data overheads from the compression algorithm. In such cases a dummy compression algorithm is applied which only makes a copy of the page. The memory compression algorithm used for a page is encoded in a page table entry. If the compression (S415) achieved for a large number of pages is very poor, it may be that there is not enough memory reserved to store them. At that time, the MMU should not allocate more memory, as the system is already under severe memory pressure, which could lead to an instability. Hence, the algorithm starts to write compressed pages to disk (S417), thereby using a list containing a history of disk accesses to determine which are the less frequently used pages. A special entry in said page table indicates whether a page is on the disk, wherein on said disk pages may be stored in an uncompressed form. If an access to a page in the compressed memory misses, said page can be supplied from the disk (S412b) without having to decompress it, which would have to be done when said page was stored in the compressed memory (S412a).

With hardware support for virtual memory, a virtual address can be looked up within a TLB. If there is a match for a specific page number stored within the TLB (a TLB hit), a physical frame number is retrieved and the memory access can continue. However, if there is no match, which is referred to as TLB miss (S409), the second port-of-call is the page table. Hardware architectures can offer the chance for a page fault handler to be installed such that a TLB miss can be handled. This page fault handler can look up the address mapping in the page table and see whether a mapping exists in this page table. If one exists, it is written back to said TLB and the faulted instruction is restarted, with the consequence that the TLB will be accessed again, said mapping will be found, and, finally, the translation will succeed. However, such a page table lookup may not be successful when there is no translation available for a virtual address, which means that a memory access to said virtual address is either bad or invalid, or when a requested page is not resident in a physical memory because it is full. In the first case, the program may be stopped and an error signal may be triggered. In the second case, the page is normally stored elsewhere, such as, e.g., on a disk. To handle this case, said page has to be taken from disk (S412b) and then put into a physical memory (S413). When the physical memory is not full (which means that query S416 can be answered with "Yes"), the page is written into said physical memory and the corresponding page table entry is modified so as to indicate that it is available in said physical memory. After that, the mapping is written into the TLB and the faulted instruction is restarted. Moreover, the page table has to be updated so as to mark buckets occupied by said page as busy (S418). On the other hand, when the physical memory is full and there are no free frames available, which means that query S416 has to be answered with "No", pages stored in said physical memory have to be swapped along with the page that needs to be written to the physical memory. Moreover, the page table has to be updated in order to mark that pages which were previously stored in the physical memory are no longer stored therein. After that, the mapping is written into the TLB and the faulted instruction is restarted.

Figure 5:
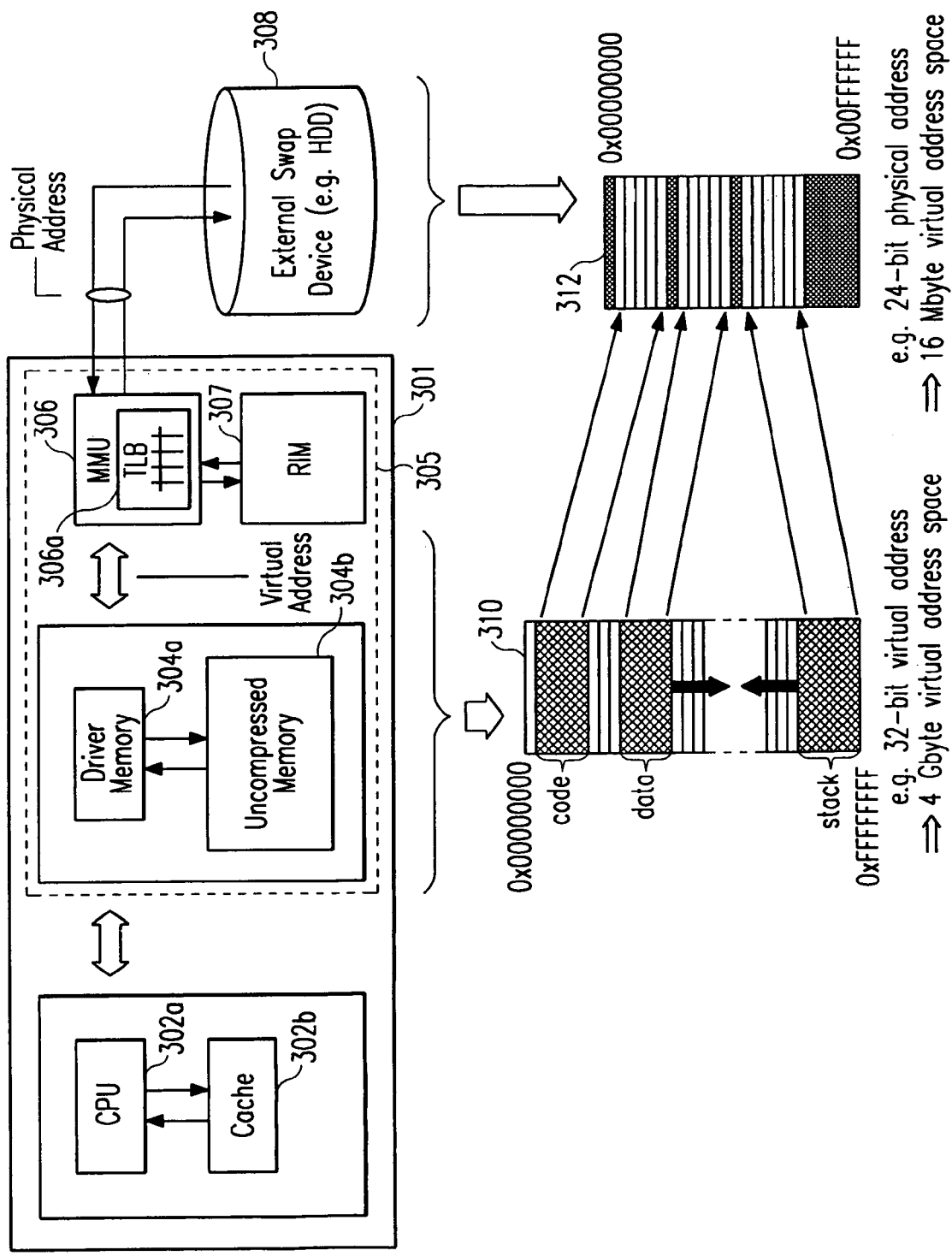
FIG. 5 shows a block diagram which illustrates the setup of the memory management system according to the present invention.

A block diagram that illustrates the proposed setup of the memory management system according to the present invention as described above is shown in FIG. 5. This setup differs from a conventional memory management system according to the prior art as described with reference to FIG. 3 by a redundancy insertion module 307 (RIM) integrated within said computing device 301, said RIM 307 being connected to the computing device's integrated MMU 306 so as to have access to the above-mentioned TLB 306a provided by said MMU 306. According to the present invention, said RIM 307 is applied for inserting no-operation (NOP) instructions represented by a number of dummy sequences of a given length L into an encoded data stream to be compressed by an algorithm implemented by an integrated compression module (not shown) of said MMU 306, wherein each of these dummy sequences is composed of a number of identical fill-in values.

Figure 6A:
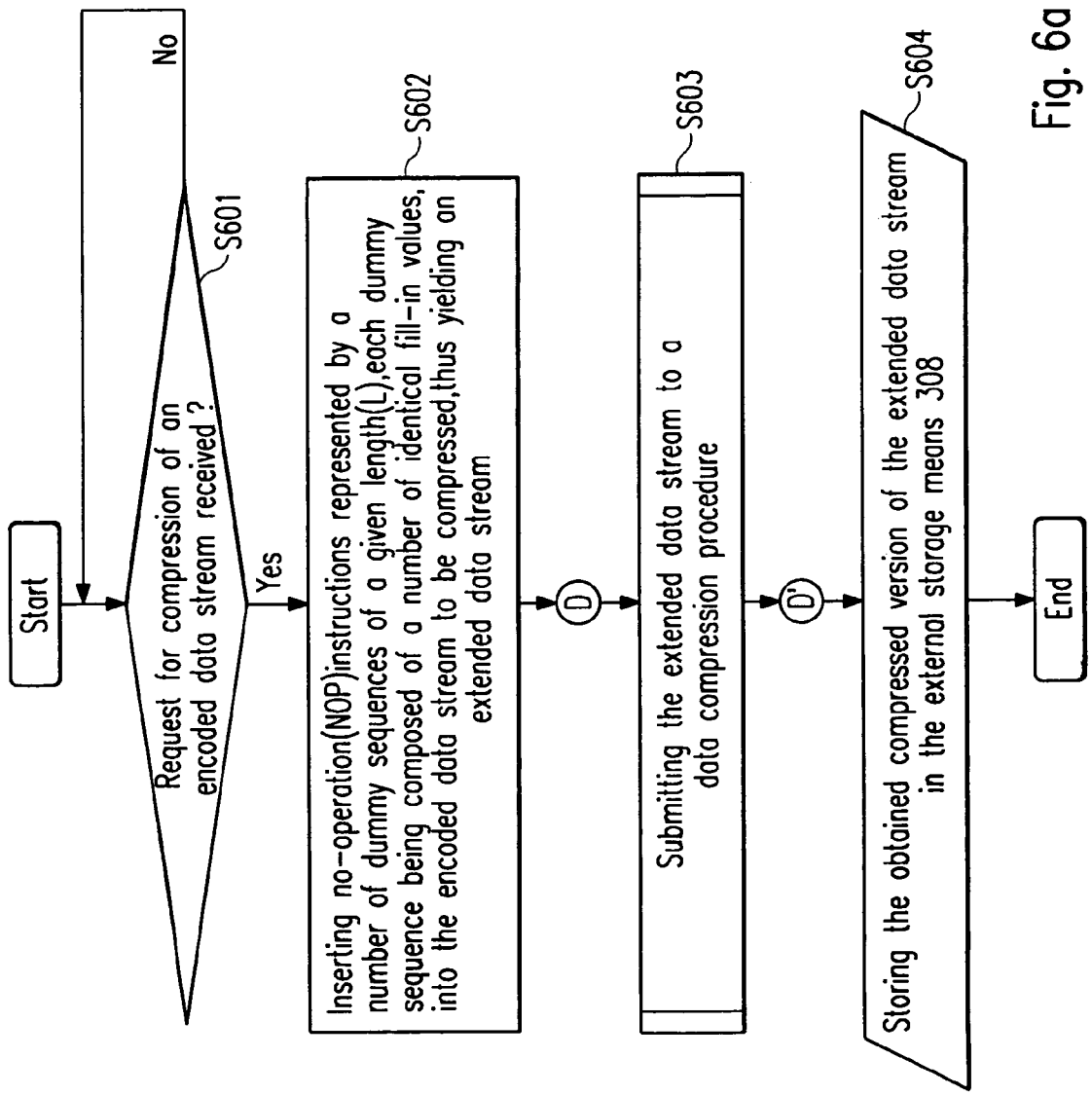
FIG. 6a shows a flow chart which illustrates the data compression method according to the present invention for supporting virtual memory management and demand paging on a computing device.

The above-described data compression method according to the present invention is illustrated by a flow chart depicted in FIG. 6a. Each time a request for compressing an encoded data stream has been received (S601), a procedure for inserting (S602) redundancy (such as, e.g., NOP instructions represented by a number of dummy sequences of a given length L) into an encoded data stream to be compressed is carried out by said RIM 307, thus yielding an extended data stream. Thereby, each of said dummy sequences is composed of a number of identical binary or hexadecimal fill-in values. After that, the extended data stream is submitted to a data compression procedure (S603), such that after compression each of said logical data blocks fits into a different one from a set of equal-sized physical data blocks of a given size, and the compressed version of the extended data stream is stored (S604) in the storage means 308.

Figure 6B:
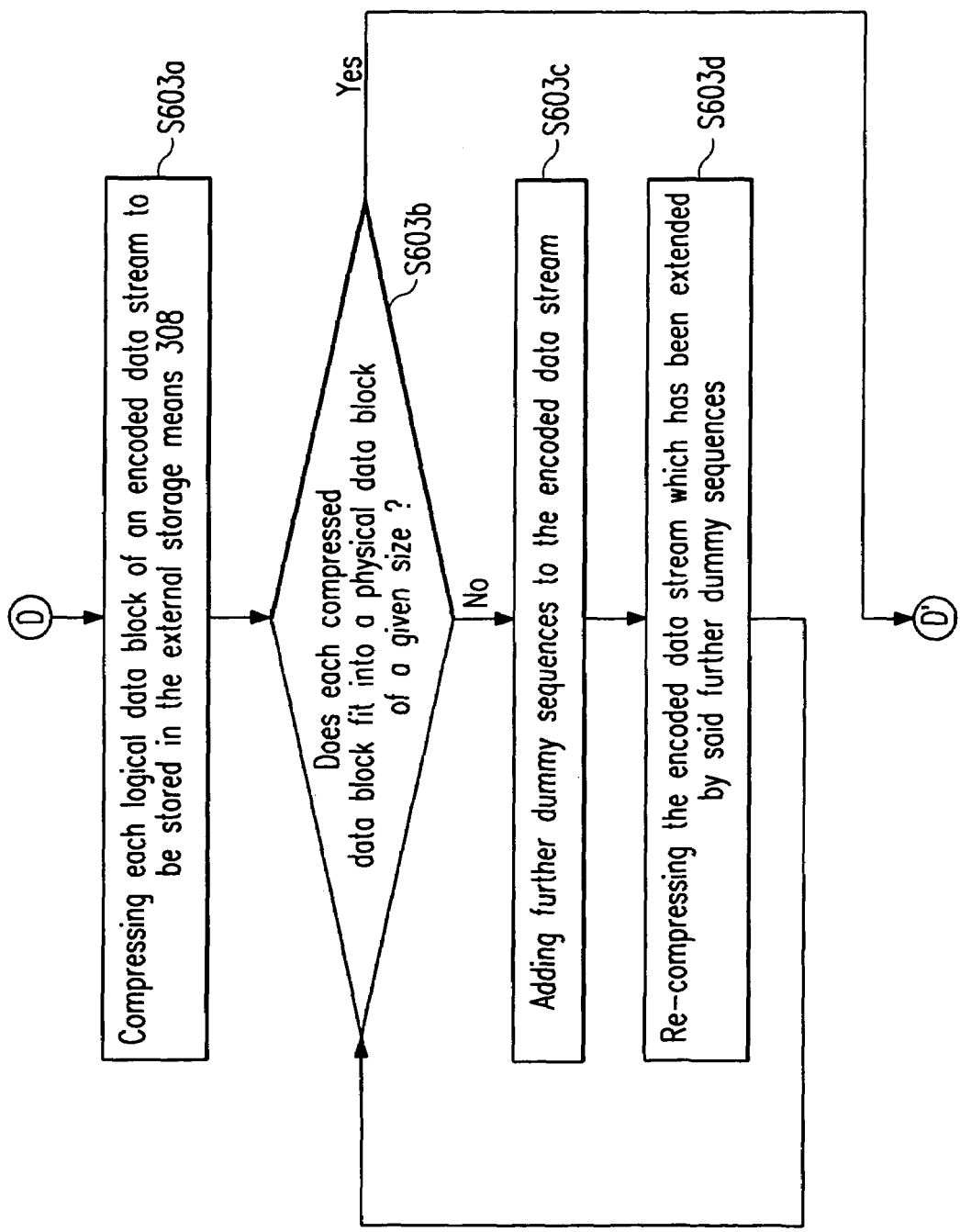

A more detailed flow chart illustrating step S603 of the aforementioned data compression method illustrated by the flow chart depicted in FIG. 6a is shown in FIG. 6b. After each logical data block of an encoded data stream to be stored in the aforementioned storage means 308 has been compressed (S603a), the procedure checks (S603b) whether each of these compressed data blocks fits into a physical data block of a given size. If this is the case, the procedure is continued with step S604 as described above. Otherwise, further dummy sequences as described in the previous paragraph with reference to FIG. 6a are added (S603c) to the encoded data stream, and then the encoded data stream which has been extended by said further dummy sequences is recompressed (S603d) until each compressed data block fits into the physical data block of the given size.

What is claimed is:

1. A virtual memory management unit of a demand paging system installed on a computing device, said demand paging system being controlled by an operating system organized according to a virtual memory management technique for translating a virtual address space accessible by a data processing unit of said computing device into a physical address space by swapping data from an addressable storage area of a memory module integrated within said computing device to a storage means used for permanently storing these data, said virtual memory management unit comprising a redundancy insertion module for inserting redundancy into an encoded data stream to be compressed, such that after compression each logical data block fits into a different one from a set of equal-sized physical data blocks of a given size, wherein said redundancy is given by no-operation (NOP) instructions represented by a number of dummy sequences of a given length (L), each dummy sequence being composed of a number of identical fill-in values.

2. The virtual memory management unit according to claim 1, wherein said redundancy comprises data or functions which are easy to compress.

3. The virtual memory management unit according to claim 1, wherein the redundancy is chosen such that each logical data block from the encoded data stream to be stored in the storage means is compressed to a fraction of its original size such that after compression each logical data block fits into a different one from a set of equal-sized physical data blocks, each physical data block having a size of said fraction of the logical data block's original size.

4. A data compression method for supporting virtual memory management and demand paging on a computing device, wherein said computing device runs an operating system organized according to a virtual memory management technique for translating a virtual address space accessible by a data processing unit of said computing device into a physical address space by swapping data from an addressable storage area of a memory module integrated within said computing device to a storage means used for permanently storing these data, said data compression method comprising:
    inserting redundancy into an encoded data stream to be compressed, thus yielding an extended data stream;
    submitting the extended data stream to a data compression procedure, such that after compression each logical data block fits into a different one from a set of equal-sized physical data blocks of a given size; and
    storing the obtained compressed version of the extended data stream in the storage means;
    wherein said redundancy is given by no-operation (NOP) instructions represented by a number of dummy sequences of a given length (L), each dummy sequence being composed of a number of identical fill-in values.

5. The data compression method according to claim 4, further comprising:
    compressing each logical data block of an encoded data stream to be stored in the storage means;
    adding redundancy to the encoded data stream in case the applied compression procedure yields a sequence of compressed data blocks in which each compressed data block is larger than the given size prescribed for physical data blocks to be stored in the storage means; and
    recompressing the encoded data stream until each compressed data block fits into a physical data block of the given size.

6. The data compression method according to claim 4, wherein said redundancy comprises data or functions which are easy to compress.

7. The data compression method according to claim 4, wherein said dummy sequences are inserted between consecutive function calls of a software program executed by an application running on said computing device, said function calls causing any changes to the application's behavior, or inside a subroutine of the application's software program if the source code of said software program contains an unconditional jump to bypass said subroutine.

8. The data compression method according to claim 4, wherein the number of said dummy sequences is chosen such that each logical data block from the encoded data stream to be stored in the storage means is compressed to a fraction of its original size such that after compression each logical data block fits into a different one from a set of equal-sized physical data blocks, each physical data block having a size of said fraction of the logical data block's original size.

9. A computer program product stored on an internal memory of a computer device, said computer program product comprising source code for executing a data compression method when running on said computing device and includes code that:
    inserts redundancy into an encoded data stream to be compressed, thus yielding an extended data stream;
    submits the extended data stream to a data compression procedure, such that after compression each logical data block fits into a different one from a set of equal-sized physical data blocks of a given size; and
    stores the obtained compressed version of the extended data stream in the storage means;
    wherein said redundancy is given by no-operation (NOP) instructions represented by a number of dummy sequences of a given length (L), each dummy sequence being composed of a number of identical fill-in values.

10. The computer program product according to claim 9, wherein the code further includes code that:
    compresses each logical data block of an encoded data stream to be stored in the storage means;
    adds redundancy to the encoded data stream in case the applied compression procedure yields a sequence of compressed data blocks in which each compressed data block is larger than the given size prescribed for physical data blocks to be stored in the storage means; and
    recompresses the encoded data stream until each compressed data block fits into a physical data block of the given size.

11. The computer program product according to claim 9, wherein said redundancy comprises data or functions which are easy to compress.

12. The computer program product according to claim 9, wherein said dummy sequences are inserted between consecutive function calls of a software program executed by an application running on said computing device, said function calls causing any changes to the application's behavior, or inside a subroutine of the application's software program if the source code of said software program contains an unconditional jump to bypass said subroutine.

13. The computer program product according to claim 9, wherein the number of said dummy sequences is chosen such that each logical data block from the encoded data stream to be stored in the storage means is compressed to a fraction of its original size such that after compression each logical data block fits into a different one from a set of equal-sized physical data blocks, each physical data block having a size of said fraction of the logical data block's original size.

14. A virtual memory management unit of a demand paging system installed on a computing device, said demand paging system being controlled by an operating system organized according to a virtual memory management technique for translating a virtual address space accessible by a data processing unit of said computing device into a physical address space by swapping data from an addressable storage area of a memory module integrated within said computing device to a storage means used for permanently storing these data, said virtual memory management unit comprising a redundancy insertion module for inserting redundancy into an encoded data stream to be compressed, such that after compression each logical data block fits into a different one from a set of equal-sized physical data blocks of a given size, wherein the redundancy is chosen such that each logical data block from the encoded data stream to be stored in the storage means is compressed to a fraction of its original size such that after compression each logical data block fits into a different one from a set of equal-sized physical data blocks, each physical data block having a size of said fraction of the logical data block's original size.

15. A data compression method for supporting virtual memory management and demand paging on a computing device, wherein said computing device runs an operating system organized according to a virtual memory management technique for translating a virtual address space accessible by a data processing unit of said computing device into a physical address space by swapping data from an addressable storage area of a memory module integrated within said computing device to a storage means used for permanently storing these data, said data compression method comprising:
    inserting redundancy into an encoded data stream to be compressed, thus yielding an extended data stream;
    submitting the extended data stream to a data compression procedure, such that after compression each logical data block fits into a different one from a set of equal-sized physical data blocks of a given size;
    storing the obtained compressed version of the extended data stream in the storage means;
    compressing each logical data block of an encoded data stream to be stored in the storage means;
    adding redundancy to the encoded data stream in case the applied compression procedure yields a sequence of compressed data blocks in which each compressed data block is larger than the given size prescribed for physical data blocks to be stored in the storage means; and
    recompressing the encoded data stream until each compressed data block fits into a physical data block of the given size.

16. A computer program product stored on an internal memory of a computer device, said computer program product comprising source code for executing a data compression method when running on said computing device and includes code that:
    inserts redundancy into an encoded data stream to be compressed, thus yielding an extended data stream;
    submits the extended data stream to a data compression procedure, such that after compression each logical data block fits into a different one from a set of equal-sized physical data blocks of a given size;
    stores the obtained compressed version of the extended data stream in the storage means;
    compresses each logical data block of an encoded data stream to be stored in the storage means;
    adds redundancy to the encoded data stream in case the applied compression procedure yields a sequence of compressed data blocks in which each compressed data block is larger than the given size prescribed for physical data blocks to be stored in the storage means; and
    recompresses the encoded data stream until each compressed data block fits into a physical data block of the given size.

* * * * *